June 2, 1970  H. D. FINCH  3,515,214
CHEMICAL WATERFLOODING TECHNIQUES USING COMPLEX SURFACTANTS
Filed April 17, 1968  2 Sheets-Sheet 1

INVENTOR:
HARRY D. FINCH
BY:
HIS AGENT

INVENTOR:
HARRY D. FINCH
BY:
HIS AGENT

3,515,214
CHEMICAL WATERFLOODING TECHNIQUES USING COMPLEX SURFACTANTS
Harry D. Finch, Houston, Tex., assignor to Shell Oil Company, New York, N.Y., a corporation of Delaware
Filed Apr. 17, 1968, Ser. No. 722,049
Int. Cl. E21b
U.S. Cl. 166—272                    15 Claims

ABSTRACT OF THE DISCLOSURE

An improved method for recovering oil from underground formations by treating said formations with an aqueous liquid containing as an essential additive a partial complex of an anionic surfactant and a moderate molecular weight amino-nitrogen-containing compound.

BACKGROUND OF THE INVENTION

Figure 1:
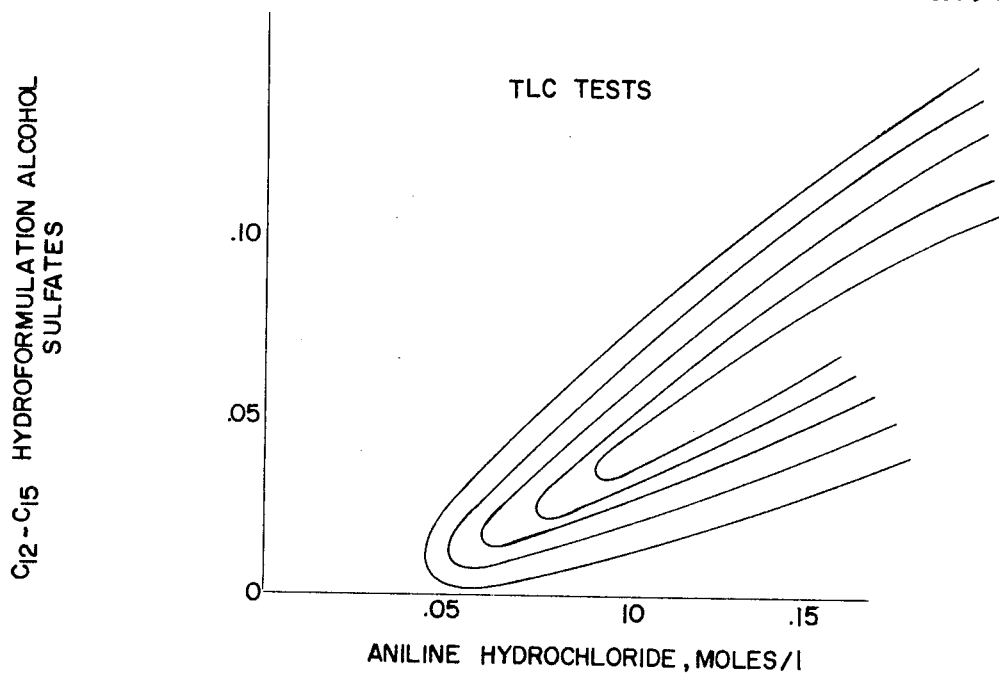

This invention relates to the displacement of oil from the pores of subterranean, oil-containing reservoirs, and more particularly to special surface-active systems to be used with "waterflooding" techniques to improve the oil displacement efficiency of waterfloods.

Knowledge is widespread in the oil industry that the so-called "primary recovery" techniques, which include natural flow, gas lifting, gas repressurization and pumping methods, leave substantial quantities of oil in oil-bearing reservoirs. In addition, there are oil-bearing reservoirs which even though containing large quantities of oil, are incapable of being produced by primary recovery techniques. Recognition of the large amount of residual oil in many oil-producing reservoirs has led to the use of the so-called "secondary recovery" techniques which have as their primary purpose the economical recovery of additional quantities of the residual oil known to be present in the reservoir.

Probably, one of the more common secondary recovery techniques is the so-called "waterflooding" in which aqueous fluids are injected at one point in the reservoir at pressures sufficient to be forced out into the reservoir and tward a spaced production well or wells, there, in effect, displacing it from the pores of the reservoir and driving the oil ahead of the water front.

However, waterflooding is only advantageous when the cost of injecting water and necessary chemical modifiers is less than the value of the oil recovered. Therefore, the displacement efficiency of waterfloods has been the determining factor of whether such a technique will be used.

Generally, the difficulty with waterfloods is that the small pores and capilaries of the reservoir contain hydrocarbons (oil and/or oil and gas) which are generally water immiscible. The existence of high interfacial tensions between the boundary of the water and hydrocarbons seriously impedes the ability of the water to displace oil trapped in the reservoir by capillarity.

Since in many oil reservoirs the oil tends to be trapped within the pores of the rock formations by capillarity merely forcing water therethrough will not displace much of this trapped oil. However, a reduction in the interfacial tension between the water and the oil will tend to increase the amount of oil that will be displaced by the water. Thus, various aqueous surfactant systems have been proposed for use in waterflooding processes for recovering oil. In many such prior systems the interfacial tension between the oil and water is reduced from a characteristic value in the order of 50 dynes per centimeter to a value of from about 1 to 10 dynes per centimeter. If the interfacial tension is reduced to only about 10 dynes per centimeter the increase in the amount of oil that can be recovered is not generally significant. Thus, the cost of obtaining the reduction in the interfacial tension is apt to be more than the value of the increase amount of oil that is recovered in many cases.

Many aqueous systems containing surfactants have been used to aid in oil recovery and among the most promising of such systems are described in U.S. Pats. 3,330,344; 3,348,611 and 3,366,174 in which improved and effective oil recovery is achieved by treating the formation with an aqueous liquid containing oil-solubilizing aqueous solution of surfactant micelles that are combined with molecules of an amphiphilic organic compound of low water solubility. In such systems the concentration of the surfactant in the aqueous solution should exceed the critical concentration for micelle formation and the amphiphilic material should be capable of swelling the surfactant micelles and cause the aqueous solution to solubilize a significant proportion of oil so as to be easily recoverable by suitable fluid drives such as waterflooding or miscible drives.

SUMMARY OF THE INVENTION

It has now been discovered that oil recovery using a fluid drive can be substantially impoved and oil recovery increased by injecting into oil-bearing formations an aqueous fluid system containing anionic surfactant and an amphiphilic material that is a low-water solubility N-substituted ammonium salt of an anionic surfactant and/or a partial complex of an anionic surfactant and an organic cation nitrogen-containing salt of middle molecular weight having a molecular weight of between about 80 and about 500. The formations thus treated should be suitably provided with injection and production wells and the aqueous fluid system of this invention can be injected prior to or simultaneously with a driving fluid which may be a miscible and/or immiscible fluid drive such as a water and/or steam or a miscible driving fluid such as $CO_2$ or a volatile hydrocarbon, e.g., LPG or the like or an aqueous surfactant system as described in the references cited above.

Aqueous surfactant systems containing relatively water-soluble surfactants and amphiphilic material of low water solubility are described in U.S. Pat. 3,330,344 on anionic, nonionic or cationic surfactants mixed with amphiphilic of any type and in U.S. 3,348,611 are described aqueous systems containing sulfonate surfactants admixed with sulfonate-surfactant amphiphiles. The surfactant systems of the present invention are distinctive from these systems in respect to the composition and properties of the amphiphilic materials and the ways in which the present surfactant-amphiphile systems are formed and function.

The aqueous surfactant systems of the present invention can be formed by dissolving an anionic surfactant in an aqueous liquid: (1) containing at least one salt that is an N-substituted ammonium salt of an anionic surfactant and has low water solubility; or (2) containing enough of at least one amine compound, which reacts with the anionic surfactant to form an N-substituted ammonium salt which should have some water solubility and preferably be quite soluble in an aqueous fluid. Under certain conditions the systems require excess of amine salt over the anionic surfactant. The N-substituted ammonium salt, and/or the amine can be added to the aqueous liquid into which the anionic surfactant is dissolved before or after the surfactant has been dissolved in that liquid.

The surfactant complex system of the present invention can be formed by dissolving a surfactant and then incompletely reacting it with an amine. The complexes of this invention can be used to adjust the amphiphilic material content of an aqueous solution or surfactant miceless to fit the temperature conditions of the earth formations to be treated. The present process provides an advantageous process for tailoring individual batches of these complexes to the conditions of the individual formations to be treated.

Surfactants useful in the formation of the complex with amino-nitrogen-containing compounds or salts can be essentially any anionic surfactant having desired solubility and includes organic sulfonates, sulfates, phosphates, carboxylates, thiocarbamates and the like, as well as mixtures thereof and their ethoxylated derivatives. These surfactants are described in the Encyclopedia of Chemical Technology, vol. 13, pages 513–535 or those listed in Schwartz and Perry on "Surface-Active Agents" or other such texts and references. Anionic surfactants of this type can be illustrated by metal organo sulfonates, e.g., alkali metal and polyvalent metal petroleum sulfonate, benzene sulfonate, naphthalene sulfonate, aniline sulfonate, alkylated benzene sulfonate; alcohol sulfates, e.g., $C_{8-30}$ alcohol sulfates and ethoxylated derivatives thereof; the carboxylates, e.g., alkali metal oleate, stearate, etc., or the sulfocarboxylate salts, alkali metal organo phosphates and their ethoxylated derivatives and mixtures thereof. Preferred are the alkali metal (Na, K, Li) petroleum sulfonates, $C_{15-18}$ alkyl sulfonate, alkylated benzene sulfonates and the alcohol sulfates and their ethoxylated derivatives. Materials of this type are sold commercially under various trade means such as petroleum sulfonates sold by Bray Chemical Company or the Bryton Chemical Company as Bryton sulfonates F, 430, 467, 500 or Socony Mobile Oil Company "Promor" sulfonates of the SS–6, SS–20 series; American Cyanamid's "Aerosol OT" which is Na dioctyl sulfosuccinate and the like.

The amino-nitrogen-containing salt compounds used to form the complex can be derivatives of mono and polyamino alkyl, aryl, cycloalkyl or heterocyclic amino containing salts having a molecular weight range of from about 50 to about 450 and include amine hydrochlorides such as arylamine or alkylamine or heterocyclic amine salts, the anion being the chloride, hydroxide, sulfate, phosphate, carbonate, citrate, borate or the like, e.g., aniline hydrochloride, toluidine hydrochloride, methyl aniline hydrochloride, phenylene diamine dihydrochloride, $C_{2-18}$ alkylamine hydrochloride, e.g., tri-n-butylamine hydrochloride, tri-octylamine hydrochloride, piperidine hydrochloride and mixtures thereof or the corresponding sulfate, hydroxide, citrate, carbonate, or phosphate.

The reactants, namely the anionic surfactant and the amine compound should be reacted in proportions and under conditions so that only a partial complex is formed and as pointed out above, the amine salt might be used in an excess to that of the anionic surfactant used to form the complex. Preferably only between 50–95% of the anionic agent should be used to form the complex.

As described in U.S. 3,348,611, the oil recovering efficiency of the aqueous petroleum sulfonate system has been ascribed to the surfactant amphiphile properties generated by the molecular weight spectrum of the sulfonate. The oil-soluble higher molecular weight constituents serve as amphiphiles and are solubilized in the aqueous system by the primarily water-soluble lower molecular weight sulfonates. A superior relationship can be established with ordinary water soluble anionic detergent-type compounds such as organic sulfate and sulfonate surfactants through partial complexation with certain organic amino-nitrogen-containing compounds as described. The surfactant-amino-nitrogen-containing complex is primarily oil-soluble and serves as an amphiphile. The uncomplexed surfactant, e.g., sulfate or sulfonate, functions as surfactant. It has been noted that these anionic detergent-type sulfates and sulfonates are themselves ineffectual in the recovery of waterflood residual crude oil.

Figure 2:
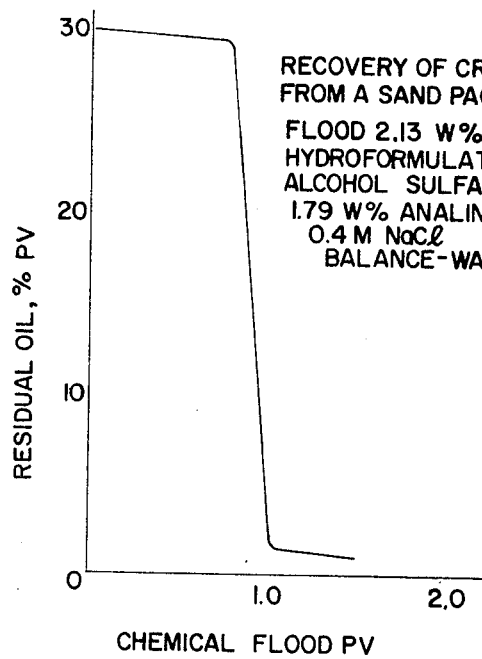
Figure 3:
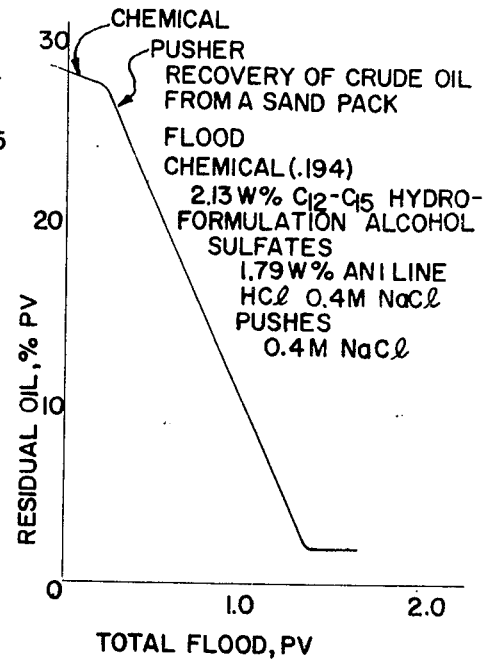
Figure 4:
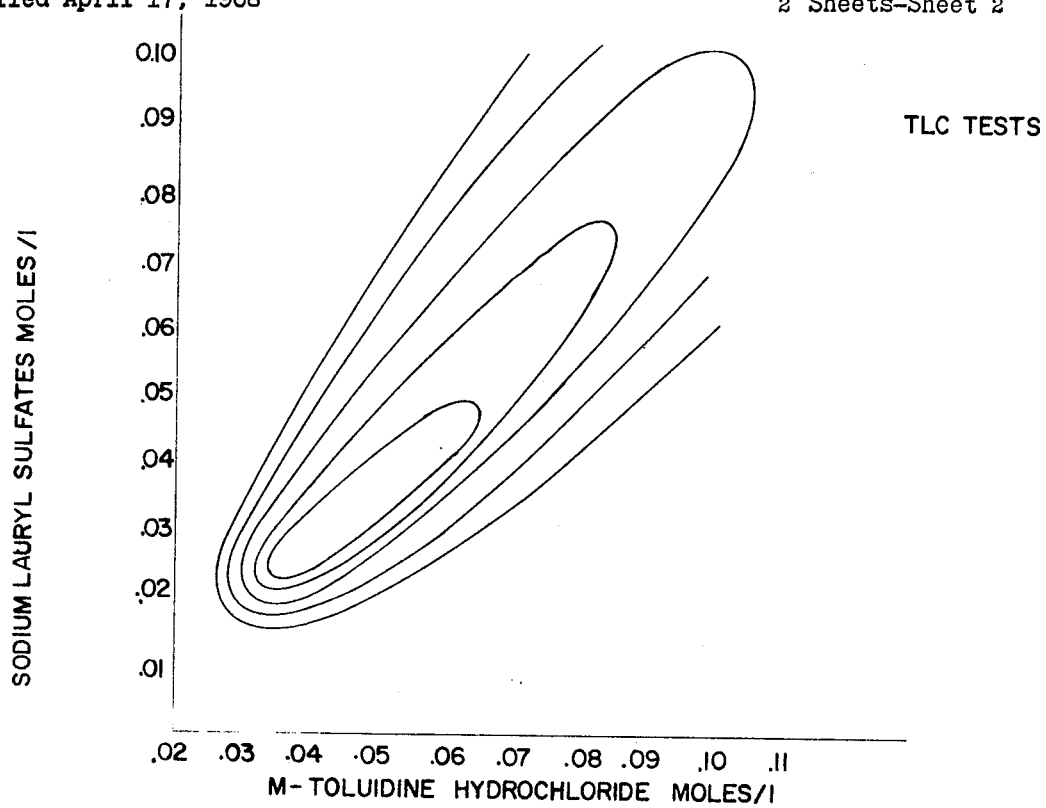
Figure 5:
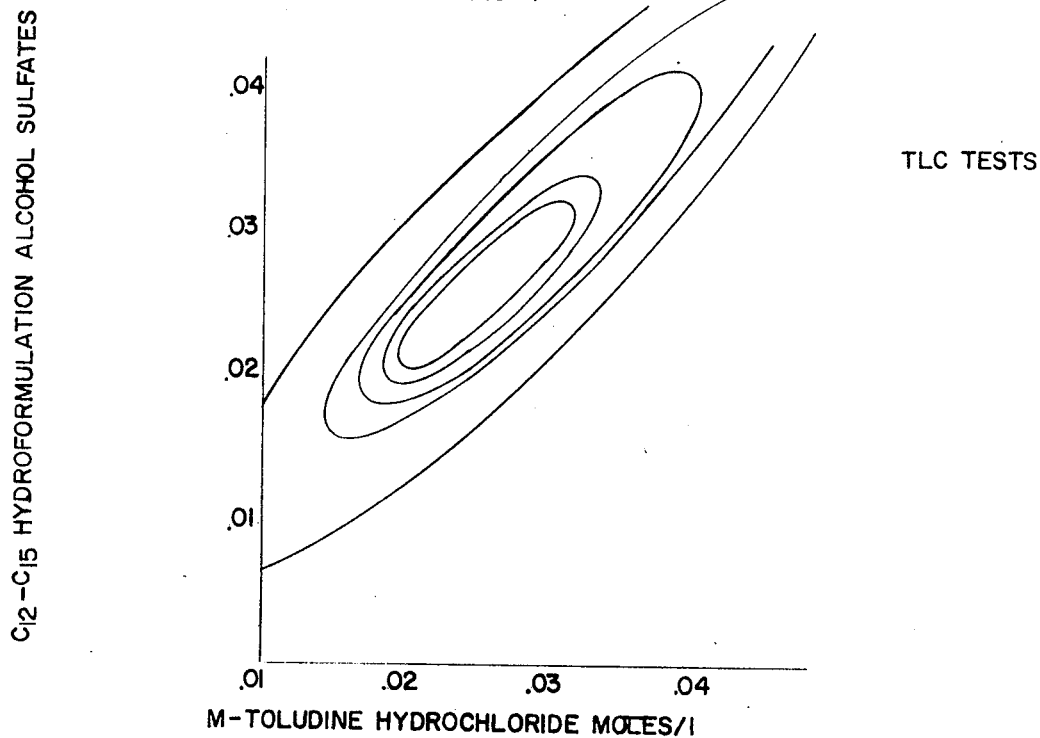

The effectiveness of the additive system of this invention is shown in FIGS. 1–5 in which the TLC test was used and the results being graphically shown (FIGS. 1–5) for the system of alcohol sulfates and aniline hydrochloride. FIG. 1 graphically records the system of $C_{12-15}$ hydroformulation alcohol sulfate and aniline hydrochloride in the TLC test for recording crude oil from sand pack. FIGS. 2 and 3 show the effect of sodium chloride on such systems while FIGS. 4 and 5 show the effect on the $R_f$ value on such systems.

PREFERRED EMBODIMENT OF THE INVENTION

Partially complexed systems of this invention have now been found to be capable of crude oil displacement in a thin layer chromatographic (TLC) screening test. These are listed in Table 1 with a rough estimate of efficiency based on their performance in the TLC screening test compared to that of Bryton 430 mahogany sulfonate-sodium chloride and the results to date are summarized in Table 1.

TABLE 1.—OIL DISPLACEMENT TESTS WITH COMPLEX OF SULFONATE AND SULFATE-AMINE SYSTEMS

| System | Oil Recovery in Sand Pack, Pore Volumes Chemical Required to Reduce Oil Saturation to 5% PV | Relative Efficiency (5% Bryton Petroleum Sulfonate) + .3 N NaCl=1 (M.W.=430) |
|---|---|---|
| 5% Bryton petroleum sulfonate M.W.= 430+.3 N NaCl | 1.0 | 1.0 |
| Sodium Dodecylbenzene Sulfonate: | | |
| Aniline Hydrochloride | 1.6 | .7 |
| p-Toluidine Hydrochloride | 1.6 | .8 |
| m-Toluidine Hydrochloride | | .9 |
| o-Toluidine Hydrochloride | | .8 |
| N-Methylaniline Hydrochloride | 3.0 | .7 |
| m-Phenylene Diamine Dihydrochloride | | .5 |
| o-Phenylenediamine Dihydrochloride | | .5 |
| Piperidine Hydrochloride | 2.0 | .8 |
| Tri n-Butylamine Hydrochloride | 2.2 | .6 |
| Sodium Lauryl Sulfate: p-Toluidine Hydrochloride | 2.5 | .6 |
| $C_{15-18}$ Sulfonates ex Wax Olefins: p-Toluidine Hydrochloride | | .3 |
| $C_{12}-C_{15}$ Hydroformulation Alcohol-3 Ethoxy Sulfate: | | |
| p-Toluidine Hydrochloride | | .3 |
| m-Toluidine Hydrochloride | | .7 |

Efficient oil displacement is generally found over a relatively specific range of concentrations for each anionic surfactant-amine salt pair. With the sodium dodecylbenzene sulfonate-m-toluidine hydrochloride complex system for instance, an efficiency of .9 relative to Bryton petroleum sulfonate (MW 430)-sodium chloride is found from .038 to .041 molar m-toluidine hydrochloride and .076 to .093 molar sulfonate.

Partially complexed systems of mixtures of $C_{12}-C_{15}$ hydroformulation alcohol sulfates and aniline hydrochloride are efficient flooding solutions for crude oil as shown in the TLC test and in sand packs as evidenced by reference to FIG. 1. In a sand pack run with a flooding solution of the composition shown by the arrows in FIG. 1, and with added sodium chloride, the residual oil saturation was reduced to 3 percent PV after 1.1 PV of flood (FIG. 2). In a similar sand pack run where a 0.2 PV slug of this chemical was injected, followed by 1.1 PV of 0.4 M sodium chloride, the residual oil was reduced to 3 percent PV (FIG. 3). This flooding solution is tolerant to sodium chloride up to at least 0.8 molar and to calcium chloride up to at least .01 molar.

Other complex systems which effectively move crude oil in the TLC test are sodium lauryl sulfate-m-toluidine hydrochloride and $C_{12}-C_{15}$ hydroformylation alcohol sulfate-m-toluidine hydrochloride. The effect of composition of the flooding solution on the $R_f$ value of the oil spot with these systems is shown in FIGS. 4 and 5. For the definition of $R_f$ note page 293 of Cassidy "Adsorption and Chromatography."

Additional results for the partially complexed system of $C_{12}$–$C_{15}$ hydroformylation alcohol sulfate are shown in Table 2.

TABLE 2

| Flooding Solution, Moles/l. | | | |
|---|---|---|---|
| $C_{12}$–$C_{15}$ Hydroformylation Alcohol Sulfates | | Aniline Hydrochloride | TLC Test, Oil Spot $R_f$ Value |
| .0191 | | .077 | .53 |
| $C_{12}$–$C_{13}$ Hydroformylation Alcohol Sulfates | | | |
| .0191 | | .077 | .09 |
| .0095 | | .077 | .11 |
| $C_{14}$–$C_{15}$ Hydroformylation Alcohol Sulfates | | | |
| .0191 | | .077 | .04 |
| .0095 | | .077 | .04 |
| $C_{12}$–$C_{13}$ Hydroformylation Alcohol Sulfates | $C_{14}$–$C_{15}$ Hydroformylation Alcohol Sulfates | | |
| .009 | .009 | .077 | .53 |

The TLC test depends on the movement of a drop of oil in a thin sand layer under the influence of the flowing aqueous phase. In this test the lower edge of a glass plate is coated with loose sand, is wetted with water, a spot of the oil to be examined is applied thereon and the plate is developed with the aqueous phase. From the above results it is to be noted that in certain formations the complex system is sensitive to the molecular weight range of the sodium alkyl sulfate component. This is noted when comparing the efficiencies of $C_{12}$–$C_{13}$ hydroformylation alcohol sulfates and $C_{14}$–$C_{15}$ hydroformylation alcohol sulfates with $C_{12}$–$C_{15}$. TLC tests on these systems summarized below, indicate that while neither $C_{12}$–$C_{13}$ hydroformylation alcohol sulfates nor $C_{14}$–$C_{15}$ hydroformylation alcohol sulfates give efficient floods alone, a 1/1 mixture of the two is equivalent to $C_{12}$–$C_{15}$ hydroformylation alcohol sulfates.

Generally, the $C_{12}$–$C_{15}$ hydroformylation alcohol sulfate aniline hydrochloride complex system contains a large excess of aniline salt over the alkyl sulfate. To determine the role of the excess aniline hydrochloride in the system and whether it can be replaced by NaCl the following tests were made and the results are shown in Table 3.

TABLE 3

| Flooding Solution, Moles/l | | | |
|---|---|---|---|
| $C_{12}$–$C_{15}$ Hydroformylation Alcohol Sulfates | Aniline Hydrochloride | Sodium Chloride | TLC Test, Oil Spot $R_f$ Value |
| .0173 | .0690 | 0 | .52 |
| .0173 | .0346 | .0342 | .03 |
| .0173 | .0346 | .102 | .03 |
| .0173 | .104 | 0 | .33 |

The TLC tests show that the excess anilinium ion is not replaceable by NaCl and that the excess anilinium ion is a necessary part of the system.

To determine the effect of NaCl on a flood system the complexes of lauryl sulfate-m-toluidinium salt were prepared as follows: A water solution containing sodium lauryl sulfate and m-toluidine hydrochloride was extracted with toluene. After washing and centrifuging to clarify, the toluene solution was evaporated and the residue was dried, yielding a waxy solid. Two preparations, resulting in products with analysis shown in Table 4 below, were made.

TABLE 4

| Starting Solution Moles m-Toluene HCl, Moles Na Lauryl Sulfate | Total Alkyl Sulfonate | Product Analysis, eq/100 g.m-Toluidine Alkyl Sulfate Salt | Cl/ as NaCl | W. Percent Accounted for in Product |
|---|---|---|---|---|
| 1.0 | .264 | .205 | .020 | .947 |
| 1.5 | .260 | .223 | .017 | 94.9 |

It is evident that the material extracted into toluene is not a 1:1 salt of m-toluidinium lauryl sulfate but contains roughly 17% and 10%, respectively, of sodium lauryl sulfate. While sodium chloride was not completely removed, its concentration was reduced to less than 10% of the total sulfate present.

These salts were soluble in water yielding clear, viscous solutions. TLC tests indicated that the solutions had poor oil displacing properties. However, on adding sufficient m-toluidine hydrochloride to adjust the ratio, alkyl sulfate/m-toluidinium ion to the optimum previously found, the solutions were equivalent to those prepared earlier by mixing sodium lauryl sulfate and m-toluidine hydrochloride and the results are shown in Table 5.

TABLE 5

| Salt | Total Alkyl Sulfate Ion | m-Toluidinium Ion | | | TLC Test, Oil Spot $R_f$ Value |
| | | m-Toluidinium Ion From Alkyl Sulfate Salt | m-Toluidine hydrochloride | Total | |
|---|---|---|---|---|---|
| Complex | .0433 | .0316 | 0 | .0316 | .03 |
|  | .0433 | .0316 | .0202 | .0518 | .57 |
| Do | .0433 | .0347 | 0 | .0347 | .08 |
|  | .0433 | .0347 | .0169 | .0516 | .59 |
| Sodium Lauryl Sulfate | .0433 | | .0520 | .0520 | .59 |

Earth formations conditioned by injection therein of aqueous solutions containing the complexes of this invention produce more oil more efficiently when such treated formations are subsequently subjected to a fluid drive to recover oil. Such drives include waterflooding, steam flooding, miscible flooding and combinations thereof such as water-steam flood drives and the like. The fluid drives can contain thickeners, viscosity increasers, pushers and the like, e.g., polyacrylamides and derivatives, polyalkylene oxide polymers, polyvinyl-alcohol sulfate and the like some of which are described in U.S. Pats. 3,341,319; 3,332,904; 3,254,719; 3,367,418; 3,368,620 and 3,370,649.

It is understood that various changes in the details described to explain the invention can be made by persons skilled in the art within the scope of the invention as expressed in the appended claims.

I claim in my invention:

1. In an oil-producing process in which oil in an oil-containing reservoir formation is displaced by the step of injecting into said formation an aqueous solution containing a partial complex of an anionic surfactant selected from the group consisting of organic sulfonate and organic sulfate and an amino-nitrogen-containing salt compound.

2. The process of claim 1 wherein the complex is derived from an organic sulfonate and an organic amine hydrochloride salt.

3. The process of claim 1 wherein the complex is derived from an organic alcohol sulfate and an organic amine hydrochloride salt.

4. The process of claim 1 wherein the complex is derived from an alkali metal petroleum sulfonate and an aromatic amine hydrochloride salt.

5. The process of claim 1 wherein the complex is derived from alkali metal petroleum sulfonate and an aromatic amine hydrochloride selected from the aniline hydrochloride, toluidine hydrochloride, phenylene diamine dihydrochloride, piperidine hydrochloride and alkyl amine hydrochloride.

6. The process of claim 5 in which the formation is subsequently subjected to a fluid drive.

7. The process of claim 6 wherein the fluid drive is water.

8. The process of claim 7 wherein the water drive contains a thickener.

9. The process of claim 8 wherein the thickener is a polyacrylamide.

10. The process of claim 6 wherein the fluid drive is steam.

11. The process of claim 1 wherein the complex is derived from a sulfonated $C_{15}$–$C_{18}$ wax olefin and an aromatic amine hydrochloride selected from the aniline hydrochloride, toluidine hydrochloride, phenylene diamine dihydrochloride, piperidine hydrochloride and alkyl amine hydrochloride.

12. The process of claim 1 wherein the complex is derived from ethoxylated long-chain aliphatic alcohol sulfate and an aromatic amine hydrochloride selected from the aniline hydrochloride, toluidine hydrochloride, phenylene diamine dihydrochloride, piperidine hydrochloride and alkyl amine hydrochloride.

13. The process of claim 7 in which the formation is subsequently subjected to a fluid drive in order to recover oil therefrom.

14. The process of claim 13 wherein the fluid drive is water.

15. The process of claim 13 wherein the fluid drive is steam.

References Cited

UNITED STATES PATENTS

| | | | |
|---|---|---|---|
| 3,292,698 | 12/1966 | Savins | 166—275 |
| 3,315,744 | 4/1967 | Dunlap | 166—275 X |
| 3,330,344 | 7/1967 | Reisberg | 166—275 X |
| 3,348,611 | 10/1967 | Reisberg | 166—275 |
| 3,373,809 | 3/1968 | Cooke | 166—273 |
| 3,391,736 | 7/1968 | Abdo | 166—275 |
| 3,406,754 | 10/1968 | Gogarty | 166—275 X |
| 3,407,877 | 10/1968 | Harvey et al. | 166—274 |

STEPHEN J. NOVOSAD, Primary Examiner

U.S. Cl. X.R.

166—274